United States Patent
Duquesne et al.

(10) Patent No.: US 7,146,790 B2
(45) Date of Patent: Dec. 12, 2006

(54) COMBINE HARVESTERS

(75) Inventors: Frank R. G. Duquesne, Zwevegem (BE); Thierry E. G. Devriese, Sint-Andries (BE); Marc R. M. Jonckheere, Snellegem (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/968,371

(22) Filed: Oct. 19, 2004

(65) Prior Publication Data

US 2005/0109004 A1 May 26, 2005

(30) Foreign Application Priority Data

Oct. 22, 2003  (GB)  .................... 0324623.8

(51) Int. Cl.
*A01D 57/00*  (2006.01)
(52) U.S. Cl. ........................................ 56/220
(58) Field of Classification Search .............. 56/219, 56/220, 221, 222, 226, 227, DIG. 19, DIG. 24, 56/399
See application file for complete search history.

(56) References Cited

U.S. PATENT DOCUMENTS

| | | | | |
|---|---|---|---|---|
| 676,320 A | * | 6/1901 | Johnson | ................... 56/399 |
| 3,104,509 A | * | 9/1963 | Clendenin et al. | ............. 56/1 |
| 3,610,387 A | * | 10/1971 | Vom Stein | ................... 193/37 |
| 3,626,472 A | * | 12/1971 | Rowland-Hill | ............... 460/70 |
| 3,703,060 A | * | 11/1972 | Gradwohl et al. | ............ 56/226 |
| 4,199,927 A | | 4/1980 | Craig et al. | |
| 4,344,442 A | * | 8/1982 | Torland et al. | ............. 460/116 |
| 4,733,672 A | * | 3/1988 | Tophinke | ...................... 460/80 |
| 5,387,153 A | * | 2/1995 | Tanis | ........................... 460/68 |
| 5,865,290 A | * | 2/1999 | Scott | ........................... 193/37 |
| 6,044,635 A | * | 4/2000 | Goering et al. | ................ 56/34 |
| 6,076,647 A | * | 6/2000 | Agnoff | ........................ 193/37 |
| 6,622,454 B1 | * | 9/2003 | Anstey | ......................... 53/118 |
| 6,782,996 B1 | * | 8/2004 | Wolf | ..................... 198/781.02 |
| 6,823,655 B1 | * | 11/2004 | Underhill et al. | ............. 56/314 |
| 2003/0110752 A1 | * | 6/2003 | Dow | ........................... 56/364 |

FOREIGN PATENT DOCUMENTS

SU         1266482        2/1987

* cited by examiner

Primary Examiner—Árpád Fábián Kovács
(74) Attorney, Agent, or Firm—Rebecca Henkel

(57) ABSTRACT

An anti-wrapping device is described for preventing crop from being wrapped about the central shaft of a reel rotatably supported on side arms of a header of a combine. The device comprises an annular cover plate for securing to the axial end of the reel to prevent the crop from becoming entangled with projections from the reel and a tubular shroud for mounting on the header support arm to surround the central shaft of the reel, the axial end of the shroud being positioned when in use in close proximity to the annular cover plate of the reel to avoid any crop being caught therebetween.

4 Claims, 2 Drawing Sheets

COMBINE HARVESTERS

FIELD OF INVENTION

The present invention relates to combine harvesters, hereinafter referred to as combines. This device prevents crop from being wrapped about the central shaft of a reel rotatably supported on the side arms of the header.

BACKGROUND OF INVENTION

It is known for a known combine to be fitted with a header that comprises a reel for gathering the crop and a screw conveyor arranged behind the reel for pushing the crop towards the center of the header. From there the crop is transported by an elevator into machinery that threshes and separates the crop. The machinery may, for example, comprise one or more rotors arranged longitudinal or transversely but these need not be described herein in detail as the invention is only concerned with the header.

The reel of the header has a central shaft that is supported at its opposite ends on side arms of the header. An enclosed mechanism transmits drive to one end of the central shaft of the reel to rotate the reel about a transverse axis as the combine moves forward. Crop separators projecting forward of the reel form dividing lines in the growing crop to demarcate the swathe to be harvested in any one pass.

In use, the combine is steered in such a manner that the driven end of the rotor usually rides over a previously harvested swathe of land. Consequently, there is no crop still growing beyond that end of the reel. However, at its other end, the reel has crop growing all around it and this causes a problem because the crop tends to wrap itself around the central shaft and to become entangled in the gap between the end of the reel and the side arm of the header in which the shaft is supported. Aside from the fact that some of the crop is ruined, it is necessary to stop the combine periodically to remove the entangled crop to avoid excessive drag on the reel.

U.S. Pat. No. 4,199,927 addresses this problem by providing what is termed therein a weed shield. The shield includes a substantially flat panel member and a vertically oriented deflector plate attached along one longitudinal edge to the inwardly facing surface of the panel member. The weed shield includes means for attaching it to the reel support arm of the combine and is designed so as to cover a majority of the end of the reel and extend forward of the reel when the shield is attached to the support arm. The deflector plate is generally rectangular and its vertical length is substantially equal to the height of the panel member at the location of attachment of the plate to the panel member. The deflector plate is located forward of the forwardmost portion of the reel and is formed with a 135° bend such that it pivots away from the panel member at a 45° included angle. The deflector plate shields the corresponding hub portion of the reel on the end of the reel adjacent to where the weed shield is attached to the support arm.

The weed shield of U.S. Pat. No. 4,199,927 acts in effect as a crop separator with an additional deflector that pushes the crop away from the hub and into the path of the reel. While this may reduce the problem, it does not solve it entire because the crop has a tendency to spring back to its vertical position in the gap which is inevitably present between the deflector plate and the reel. Furthermore, a significant additional loading is placed on the ends of the reel as they have to harvest a crop has been bunched together and rendered more dense by the action of the deflector plate.

SUMMARY OF INVENTION

According to the present invention, there is provided an anti-wrapping device for preventing crop from being wrapped about the central shaft of a reel rotatably supported on side arms of a header of a combine, the device comprising an annular cover plate for securing to the axial end of the reel to prevent the crop from becoming entangled with projections from the reel and a tubular shroud for mounting on the header support arm to surround the central shaft of the reel, the axial end of the shroud being positioned when in use in close proximity to the annular cover plate of the reel to avoid any crop being caught therebetween.

As there are components of the reel near its end on which crop can become entangled, it is preferred for the cover plate to have a cylindrical outer rim to fit over the axial end of the reel. In addition to minimizing the risk of crop entanglement, such a cylindrical rim also adds rigidity to the cover plate, enabling it to be made simply from sheet metal stock.

It is also advantageous to provide cover plate with a cylindrical inner rim projecting away from the reel. Once again, this adds rigidity to the cover plate to prevent it from buckling. Furthermore, it is then possible to form the shroud as a cylinder of which the end fits over the cylindrical inner rim of the cover plate. Without direct contact between the stationary shroud and the rotating cover plate, such an overlap creates an effective labyrinth seal preventing the crop from being caught in any gap between the two. If desired, it would be possible to place a packing, such as a felt sleeve, between the shroud and the cover plate, though this is not deemed necessary.

It has also been found that the size of the shroud is important in preventing wrapping of the crop around the hub of the reel. In particular, if the shroud circumference is greater than the height of the crop, then wrapping cannot occur. As no single stalk can encircle the shroud, it tends to fall off or be brushed off naturally. With this in mind, it is desirable for the circumference of the shroud to exceeds 150 cms, more preferably 200 cms.

For ease of fitting, it is possible to form each of the cover plate and the shroud of separable parts. This enables the device to be fitted to a reel without having to remove the reel from the header.

BRIEF DESCRIPTION OF DRAWINGS

The invention will now be described further, by way of example, with reference to the accompanying drawings, in which.

DETAILED DESCRIPTION OF A PREFERRED EMBODIMENT

Figure 1:
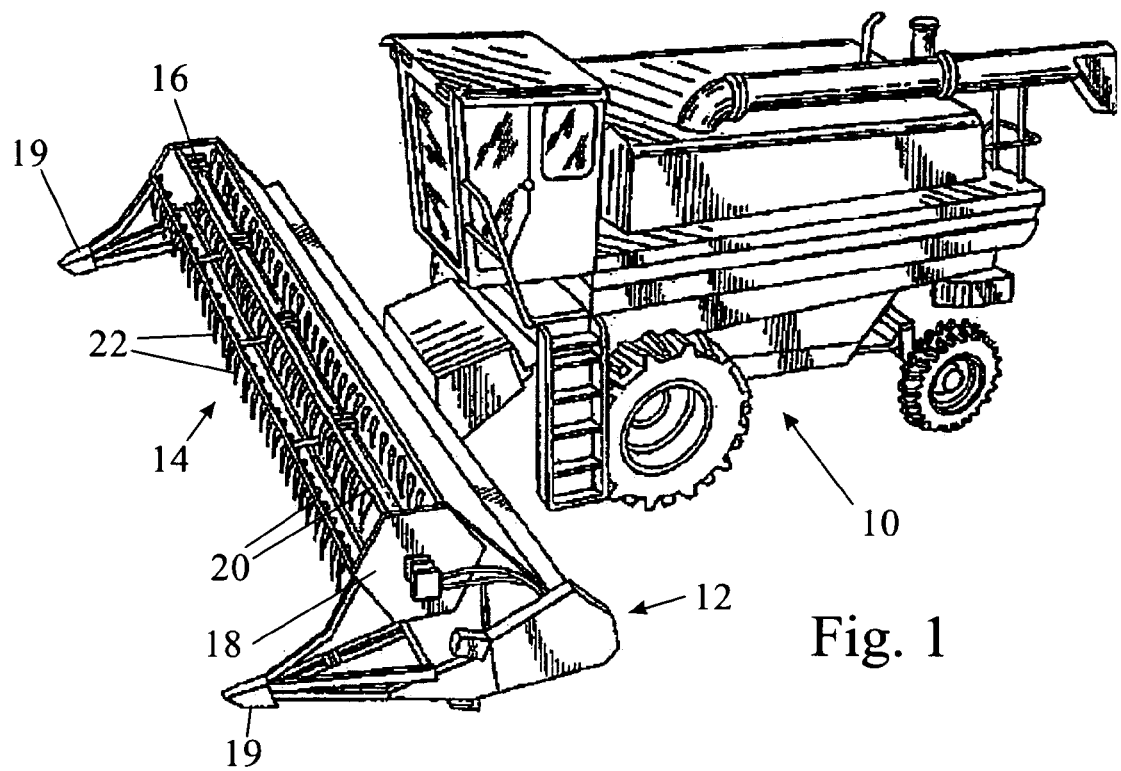
FIG. 1 is a schematic representation of a combine fitted with a header having a rotatable reel.
Figure 2:
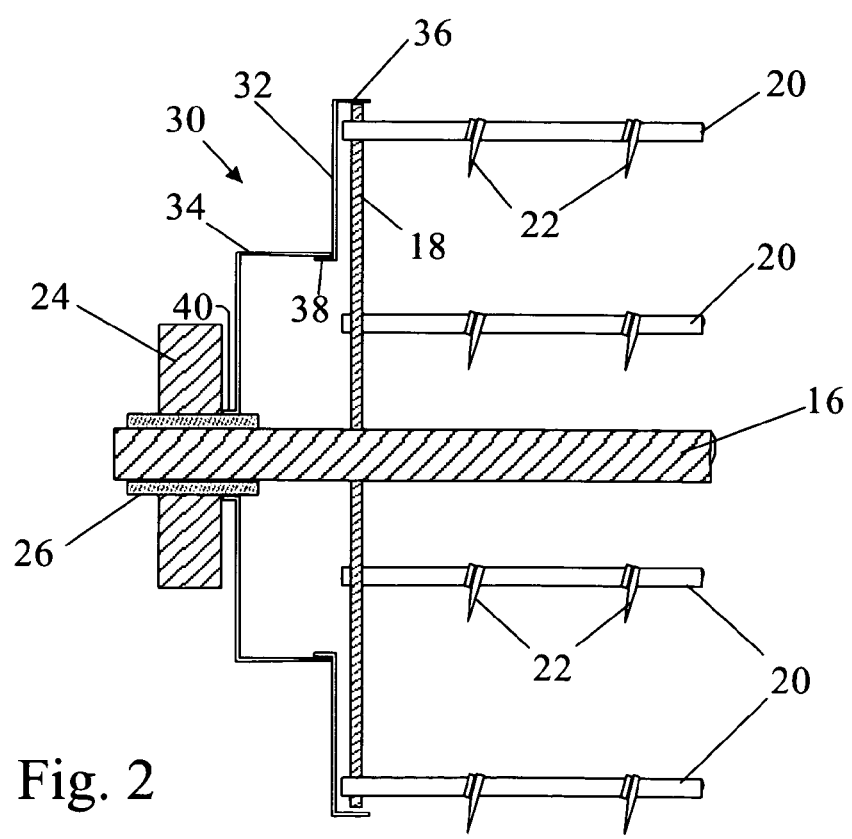
FIG. 2 is a section showing schematically one end of the reel fitted with an anti-wrapping device of the invention.

Referring to FIGS. 1 and 2, a combine 10 is fitted with a header 12 carrying a reel 14 that rotates about a transverse axis. The reel has a central shaft 16 and two hexagonal end plates 18. Bars 20 carrying tines 22 extend between the two end, the tines 22 acting to pull up the crop from the ground. At each end, the central shaft 16 is supported a side arm 24 of the header 12 by means of a journal bearing housing 26.

Crop separators 19 project forwards of the reel 14 to demarcate the swathe of land to be harvested.

Conventionally, various components of the reel 14, such as the fixings attaching the ends of the bars 20 to the hexagonal plates 18, protrude from the plates 18. These act to wrap crop about the section of the shaft 16 between the side arm 24 of the header 12 and the plate 18 and eventually the farmer will need to remove this entangled crop.

Figure 3:
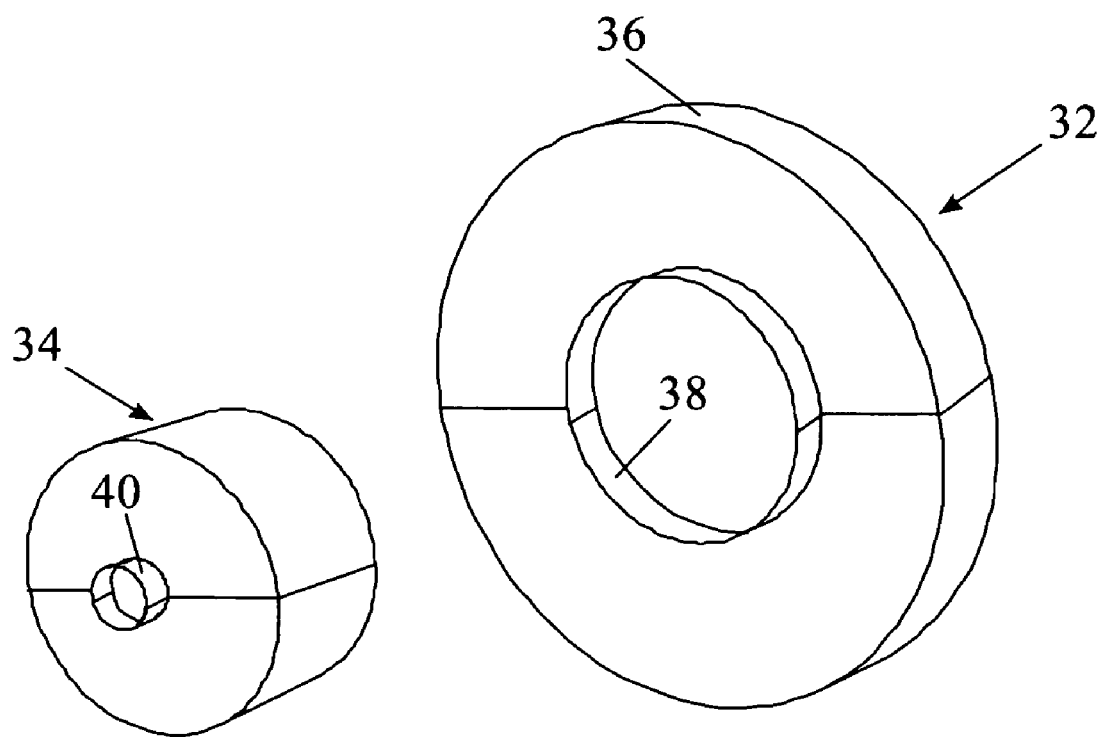
FIG. 3 is a perspective view of the anti-wrapping device of FIG. 2.

To overcome this problem, the present invention provides an anti-wrapping device 30 made up of two components that are shown in section in FIG. 2 and in perspective in FIG. 3. The first component is an annular cover plate 32 that fits over the end plate 18 of the reel 14 and rotates with the reel. The second component is a stationary cylindrical shroud or cowling 34 that is fixed to the header side arm 24 or to the journal bearing housing 26 and does not rotate with the reel 14.

The annular cover plate 32 serves to enclose all the projections from the end plate 18 to provide a smooth surface that cannot become entangled with the crop. Any crop tending to stick to the cover plate 32 for any reason is thrown off by centrifugal action. The cover plate 32 of the preferred embodiment has a cylindrical outer rim 36 that fits over the end plate 18 of the reel. The rim 36 will act to center the cover plate 32 on the reel and will also encase any items projecting radially from the end reel, on which crop could become entangled. The cover plate 32 is formed with a second cylindrical inner rim 38 that projects away from the end plate 18 of the reel 14 and fits inside the shroud 34.

The cover plate 32 could be slightly dished but it is less expensive to stamp it from flat sheet metal. In this connection, it is important to note that the cylindrical rims act to strengthen the cover plate to prevent it from buckling. It will also be noted from FIG. 3 that, in common with the shroud 34, the cover plate is formed of two semi-circular parts that are joined to one another. This is to permit the anti-wrapping device to be fitted to the end of a reel 14 without having first to remove the from the side arm 24 of the header 12.

The stationary shroud 34 is formed as a tube that is mounted about the hub of the reel to enclose the otherwise exposed section of the central shaft 16 lying between the end plate 18 of the reel 14 and the side arm 24 of the header 12. Because the shroud 34 does not rotate, it does not act to drag the crop around it. Wrapping of the crop around the shroud 34 is prevented still more effectively if it has a diameter that exceeds the height of the crop and, to this end, the circumference of the shroud should exceed 150 cms and more preferably 200 cms.

The shroud 34 has a cylinder body of circular cross section that extends up to but does not touch the cover plate 32. As the cover plate 32 and the shroud 34 move relative to one another, contact would cause wear. It would be possible to provide a packing between the two but it is preferred to form a labyrinth seal to prevent crop from entering in the gap between them. Such a seal is created by the cylindrical inner rim 38 of the cover plate 32 fitting within the end of the shroud 34 as the clearance between the two is too small to allow any crop to enter and to become entangled between them. However, in order to avoid any rotating cylindrical surface, the inner rim of the cover plate 32 is disposed within the shroud 34 instead of surrounding it.

The opposite end of the cylindrical shroud needs only to be secured in a suitable manner to the side arm 24 of the header 12 and in the illustrated embodiment it is provided with cylindrical inner rim 40 that fits around the journal bearing housing 26. The end of the shroud 34 remote from the reel may however be contoured as desired to enable it to be secured to a stationary part of the header while preventing any crop from entering between the rotating cover plate 32 and the header 12.

The invention claimed is:

1. An anti-wrapping device for preventing crop from being wrapped about a central shaft of a reel rotatably supported on side arms of a header of a combine, the central shaft extending along an axis, the comprising:

an annular cover plate for securing to a first axial end of the reel to rotate therewith and to prevent the crop from becoming entangled with projections from the reel, the cover plate including a plate portion having an inner rim extending laterally from an inner edge of the plate portion in a first direction and an outer rim extending laterally from an outer edge of the plate portion that is radially spaced from the inner edge in a second direction that is opposite to the first direction; and a tubular shroud operatively connected to the header to surround the central shaft of the reel, the shroud having a diameter and having a first end being positioned when in use in close proximity to the plate portion of the annular cover plate of the reel to avoid any crop being caught therebetween, wherein:

the outer edge of the cover plate defines a generally cylindrical area having a diameter greater than the diameter of the tubular shroud;

the annular cover plate and the shroud rotate relative to one another with rotation of the reel;

the annular cover plate rotates with the reel;

the shroud does not rotate with the reel; and the outer edge of the annular cover plate encloses a portion of a length of the reel in a radial direction.

2. An anti-wrapping device as claimed in claim 1, wherein the reel includes an end plate attached to the first end thereof and wherein the outer rim of the annular cover plate fits over the end plate.

3. A combine for harvesting a crop, comprising:

a header having a pair of side arms;

a reel rotatably supported on a shaft mounted between the side arms of the header, the reel having a first end and a plurality of tines;

an end plate mounted to the first end of the reel and having a diameter;

an anti-wrapping device comprising:

an annular cover plate for securing to an axial end of the reel to prevent the crop from becoming entangled with projections from the reel, the cover plate including a plate portion having an outer rim extending laterally from an outer edge of thereof that fits over the end plate, and a tubular shroud operatively connected to the header to surround the central shaft of the reel and having a diameter, a first end of the shroud being positioned adjacent to the plate portion of the annular cover plate of the reel to inhibit the crop from being caught therebetween, wherein:

the diameter of the end plate is greater than the diameter of the shroud, the annular cover plate rotates with the reel and the shroud is stationary, the outer rim of the annular cover plate encloses at least a portion of the tines extending from the reel.

4. An anti-wrapping device as claimed in claim 3, wherein the cover plate has an inner rim projecting from an inner edge of the plate portion, wherein the inner rim is received within the shroud.

* * * * *